(12) United States Patent  
Sugahara

(10) Patent No.: US 11,052,586 B2  
(45) Date of Patent: Jul. 6, 2021

(54) LINEAR MOTION MECHANISM OF INJECTION MOLDING MACHINE

(71) Applicant: FANUC CORPORATION, Yamanashi (JP)

(72) Inventor: Keisuke Sugahara, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/568,443

(22) Filed: Sep. 12, 2019

(65) Prior Publication Data

US 2020/0086541 A1 Mar. 19, 2020

(30) Foreign Application Priority Data

Sep. 13, 2018 (JP) .............................. JP2018-171898

(51) Int. Cl.
*B29C 45/17* (2006.01)

(52) U.S. Cl.
CPC ...... *B29C 45/1761* (2013.01); *B29C 45/1777* (2013.01)

(58) Field of Classification Search
CPC ............ B29C 45/1761; B29C 45/1777; B29C 2045/1763; B29C 2045/1767; B29C 45/1781; B29C 45/1773
See application file for complete search history.

(56) References Cited

U.S. PATENT DOCUMENTS

| | | | | |
|---|---|---|---|---|
| 4,133,622 A | * | 1/1979 | Braun | ................. B29C 45/0441 |
| | | | | 264/328.11 |
| 4,708,622 A | | 11/1987 | Hehl | |
| 5,780,078 A | * | 7/1998 | Chen | ...................... B29C 45/07 |
| | | | | 264/328.11 |
| 6,039,559 A | * | 3/2000 | Eppich | ................ B29C 45/1777 |
| | | | | 425/574 |
| 6,354,829 B1 | * | 3/2002 | Koide | ................. B29C 45/1761 |
| | | | | 425/557 |
| 6,524,095 B1 | * | 2/2003 | Ito | ....................... B29C 45/1777 |
| | | | | 425/574 |

(Continued)

FOREIGN PATENT DOCUMENTS

CN 1446679 A 10/2003
CN 102001164 A 4/2011
(Continued)

OTHER PUBLICATIONS

English Machine Translation of Decision to Grant a Patent mailed by Japan Patent Office (JPO) for Application No. JP2018-171898, dated Jul. 14, 2020, 2 pages.

(Continued)

*Primary Examiner* — Xiao S Zhao  
*Assistant Examiner* — Emmanuel S Luk  
(74) *Attorney, Agent, or Firm* — Fredrikson & Byron, P.A.

(57) ABSTRACT

A linear motion mechanism for moving an injection unit in the front-rear direction relative to a machine base supporting the injection unit includes: a pair of first linear guides configured to linearly move the injection unit relative to the machine base; and one or more pairs of second linear guides arranged on the rear side relative to the pair of first linear guides, and configured to linearly move the injection unit relative to the machine base.

12 Claims, 6 Drawing Sheets

(56) References Cited

U.S. PATENT DOCUMENTS

| | | | | |
|---|---|---|---|---|
| 6,613,262 | B1* | 9/2003 | Arend | B22D 17/005 |
| | | | | 264/255 |
| 7,402,036 | B2* | 7/2008 | Schmidt | B29C 45/07 |
| | | | | 425/150 |
| 7,955,068 | B2* | 6/2011 | Kitta | B29C 45/1761 |
| | | | | 425/145 |
| 9,283,705 | B2* | 3/2016 | Yano | B29C 45/5008 |
| 2003/0049351 | A1 | 3/2003 | Kasai et al. | |
| 2003/0219509 | A1* | 11/2003 | Yoshioka | B29C 45/1777 |
| | | | | 425/594 |
| 2004/0096541 | A1* | 5/2004 | Deng | B29C 45/1777 |
| | | | | 425/575 |
| 2004/0185143 | A1* | 9/2004 | Nishimura | B29C 45/1761 |
| | | | | 425/589 |
| 2005/0053686 | A1* | 3/2005 | Nagaya | B29C 45/1777 |
| | | | | 425/149 |
| 2006/0127528 | A1* | 6/2006 | Schmidt | B29C 45/1761 |
| | | | | 425/574 |
| 2007/0087080 | A1* | 4/2007 | Weinmann | B29C 45/1761 |
| | | | | 425/574 |
| 2007/0237853 | A1* | 10/2007 | Hsu | B29C 45/1773 |
| | | | | 425/570 |
| 2010/0112120 | A1* | 5/2010 | Kitta | B29C 45/5008 |
| | | | | 425/542 |
| 2011/0151048 | A1* | 6/2011 | Schad | B29C 45/1773 |
| | | | | 425/574 |
| 2015/0158222 | A1* | 6/2015 | Kitta | B29C 45/1777 |
| | | | | 425/569 |
| 2015/0283740 | A1* | 10/2015 | Koike | F27B 9/30 |
| | | | | 264/265 |
| 2017/0291342 | A1* | 10/2017 | Dirneder | B29C 45/74 |
| 2019/0030773 | A1* | 1/2019 | Sugahara | B29C 45/1744 |

FOREIGN PATENT DOCUMENTS

| | | | |
|---|---|---|---|
| CN | 106363865 | A | 2/2017 |
| CN | 107225742 | A | 10/2017 |
| DE | 202006012268 | U1 | 4/2007 |
| JP | 9174606 | A | 12/1996 |
| JP | 9174606 | A | 7/1997 |
| JP | 2003136567 | A | 5/2003 |
| JP | 2006007479 | A | 1/2006 |
| JP | 2010111020 | A | 5/2010 |
| JP | 2018167467 | A | 11/2018 |

OTHER PUBLICATIONS

Untranslated Decision to Grant a Patent mailed by Japan Patent Office (JPO) for Application No. JP2018-171898, dated Jul. 14, 2020, 3 pages.

English Machine Translation of Notification of Reasons for Refusal mailed by Japan Patent Office (JPO) for Application No. JP2018-171898, dated Jun. 2, 2020, 3 pages.

Untranslated Notification of Reasons for Refusal mailed by Japan Patent Office (JPO) for Application No. JP2018-171898, dated Jun. 2, 2020, 3 pages.

English Abstract and Machine Translation for Japanese Publication No. JP2003-136567A, published May 14, 2003, 8 pgs.

English Abstract and Machine Translation for Japanese Publication No. JP2006-007479A, published Jan. 12, 2006, 13 pgs.

English Abstract and Machine Translation for Japanese Publication No. JP2010-111020A, published May 20, 2010, 12 pgs.

English Abstract and Machine Translation for Japanese Publication No. JP2018-167467A, published Nov. 1, 2018, 23 pgs.

English Abstract and Machine Translation for Japanese Publication No. 09-174606 A, published Dec. 2, 1996, 3 pgs.

English Abstract and Machine Translation for Japanese Publication No. 09-174606 A, published Jul. 8, 1997, 3 pgs.

English Abstract and Machine Translation for Chinese Publication No. CN 1446679A, published Oct. 8, 2003, 30 pgs.

English Abstract and Machine Translation for Chinese Publication No. CN 102001164A, published Apr. 6, 2011, 17 pgs.

English Abstract and Machine Translation for Chinese Publication No. CN 106363865A, published Feb. 1, 2017, 15 pgs.

English Abstract and Machine Translation for Chinese Publication No. CN 107225742A, published Oct. 3, 2017, 17 pgs.

English Abstract and Machine Translation for German Publication No. DE202006012268 U1, published Apr. 5, 2007, 15 pgs.

* cited by examiner

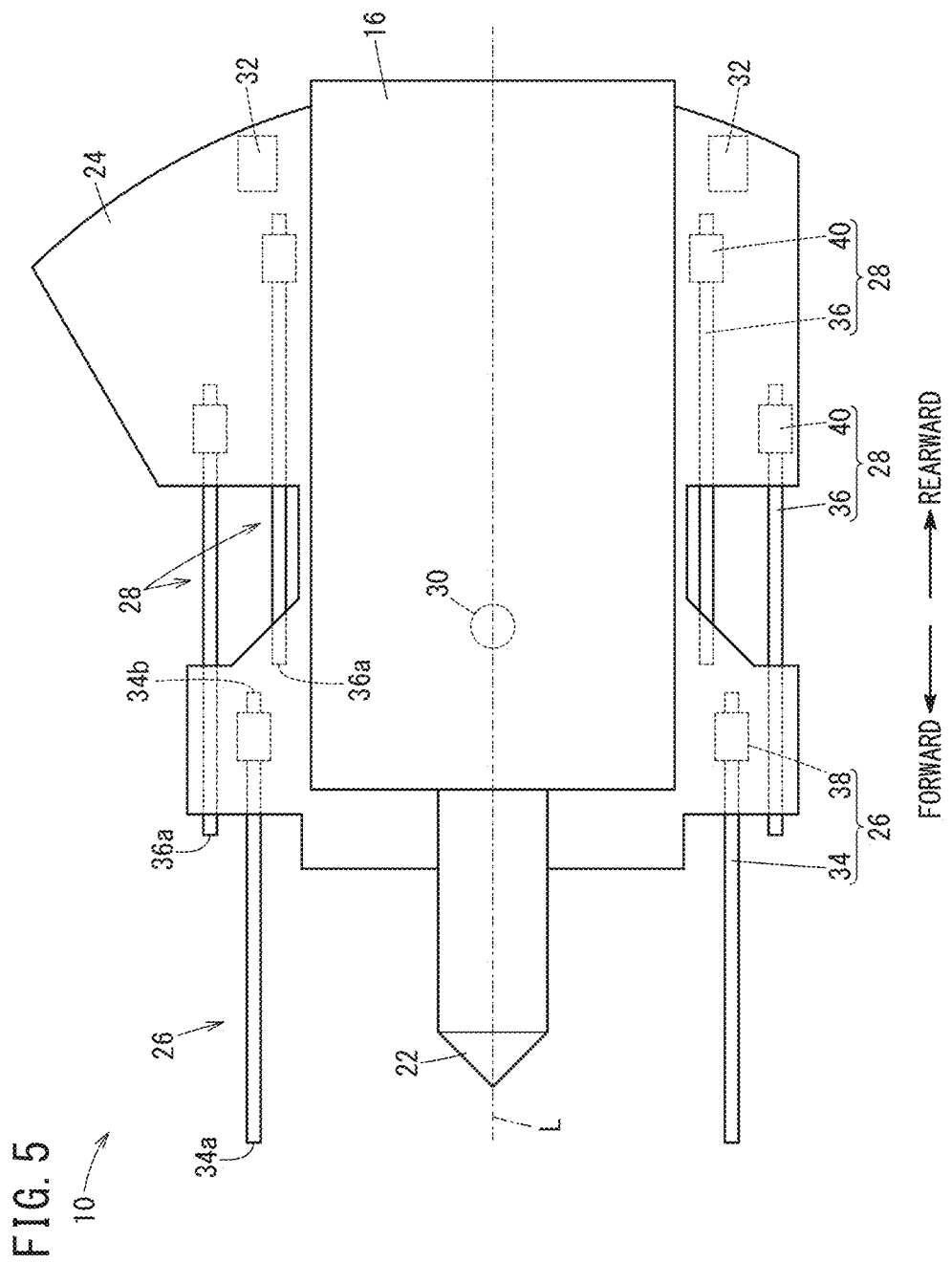

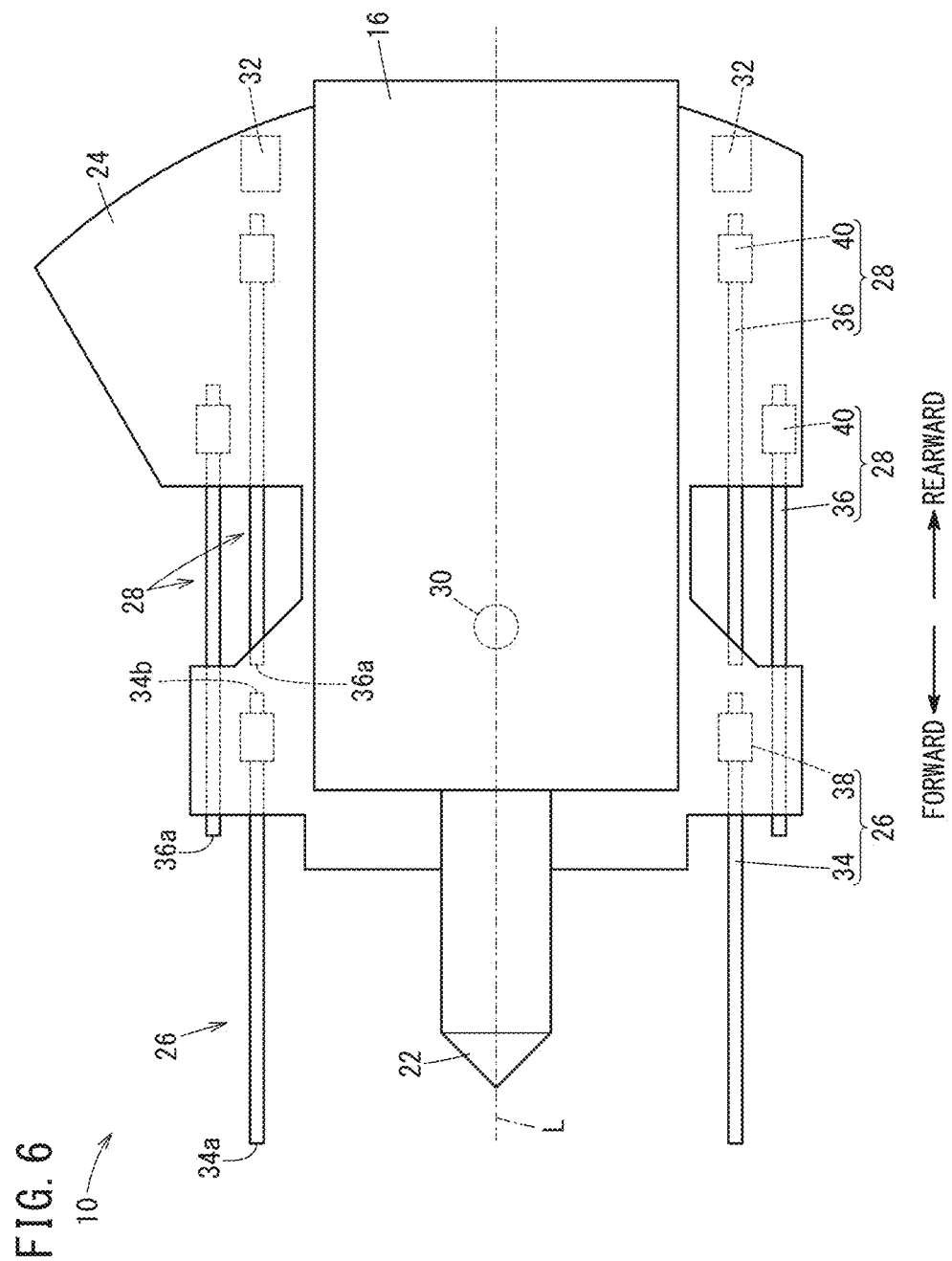

LINEAR MOTION MECHANISM OF INJECTION MOLDING MACHINE

CROSS-REFERENCE TO RELATED APPLICATION

This application is based upon and claims the benefit of priority from Japanese Patent Application No. 2018-171898 filed on Sep. 13, 2018, the contents of which are incorporated herein by reference.

BACKGROUND OF THE INVENTION

Field of the Invention

The present invention relates to a linear motion mechanism of an injection molding machine.

Description of the Related Art

As disclosed in Japanese Laid-Open Patent Publication No. 09-174606, there have been injection molding machines that include a linear motion mechanism for moving the injection unit in the back and forth direction (for performing linear motion). The linear motion mechanism of an injection molding machine has a linear guide as disclosed in, for example, Japanese Laid-Open Patent Publication No. 09-174606.

SUMMARY OF THE INVENTION

The linear guide of the linear motion mechanism of the injection molding machine needs to be larger as the injection unit becomes larger. However, for example, in the linear guide, longer guide rails tend to be more difficult to manufacture, resulting in poor availability (procurability).

In addition, as shown in Japanese Laid-Open Patent Publication No. 09-174606, it is common in the injection molding machine to support the whole of the injection unit, i.e., from its front part to the rear part, with a single linear guide. However, when the front part and the rear part of the injection unit are supported by a single linear guide, the installation position of the linear guide is subjected to restrictions, depending on the shape or design of the injection unit, for example.

It is therefore an object of the present invention to provide a linear motion mechanism of an injection molding machine which is excellent in the availability (procurability) of the linear guide and in the flexibility of the arrangement of the linear guide.

One aspect of the present invention resides in a linear motion mechanism of an injection molding machine for moving an injection unit in the front-rear direction relative to a machine base supporting the injection unit, including: a pair of first linear guides configured to linearly move the injection unit relative to the machine base; and one or more pairs of second linear guides arranged on the rear side relative to the pair of first linear guides, and configured to linearly move the injection unit relative to the machine base.

According to the present invention, the first linear guide and the second linear guide can be made smaller than conventional linear guides. Thus, it is possible to improve the availability of linear guides.

Also, each of the paired first linear guides and the one or more pairs of second linear guides is a separate component. Therefore, for example, a person skilled in the art may appropriately arrange them according to the configuration of the injection molding machine. This allows flexibility in arrangement or layout of linear guides.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a top view of a linear motion mechanism of an injection molding machine of Modification 3; and FIG. 6 is a top view of a linear motion mechanism of an injection molding machine of Modification 4.

DESCRIPTION OF THE PREFERRED EMBODIMENTS

The linear motion mechanism of an injection molding machine according to the present invention will be detailed below by describing preferred embodiments with reference to the accompanying drawings.

Configuration of First Embodiment

Figure 1:
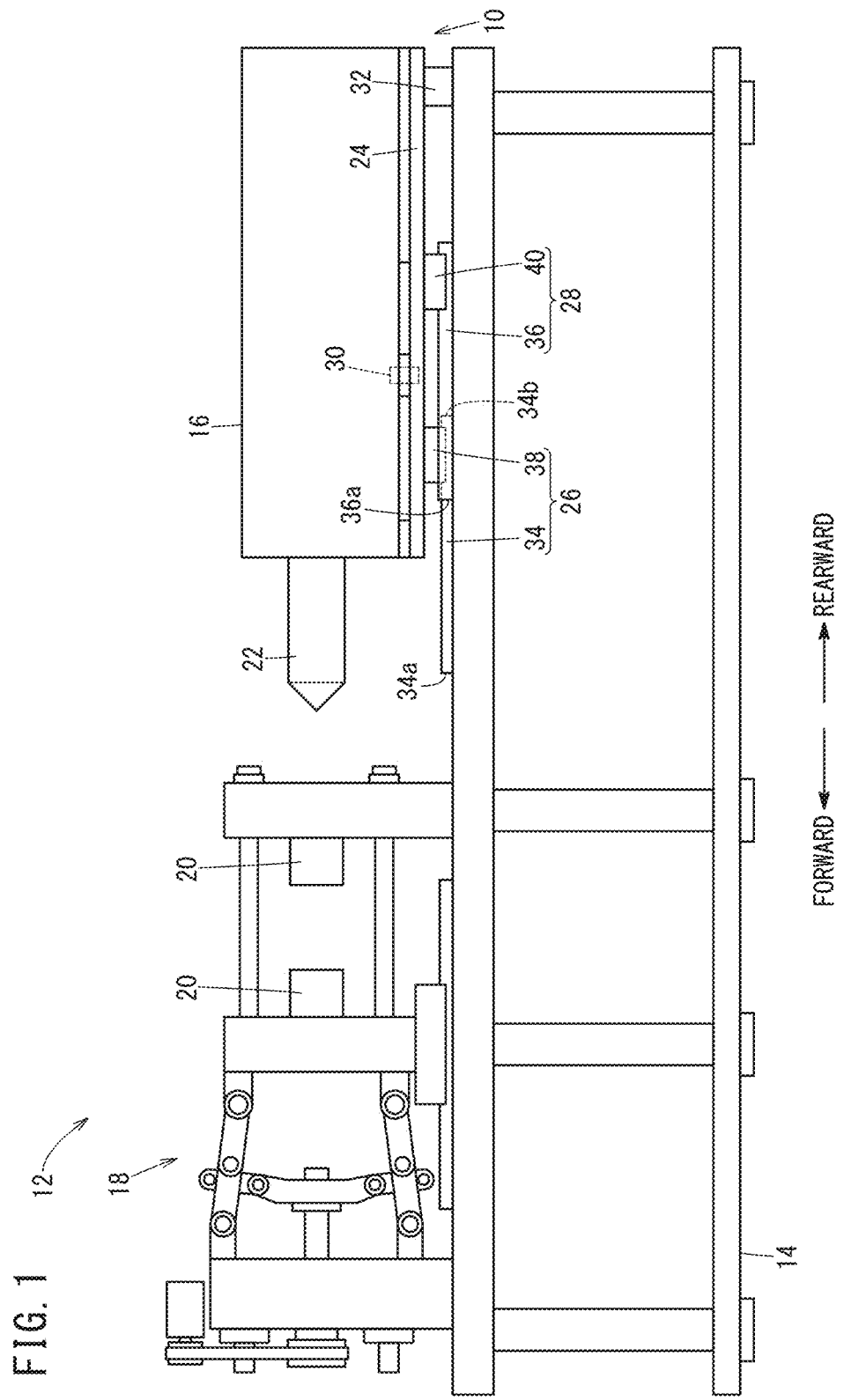
FIG. 1 is a side view of a linear motion mechanism of an injection molding machine of the first embodiment.
Figure 2:
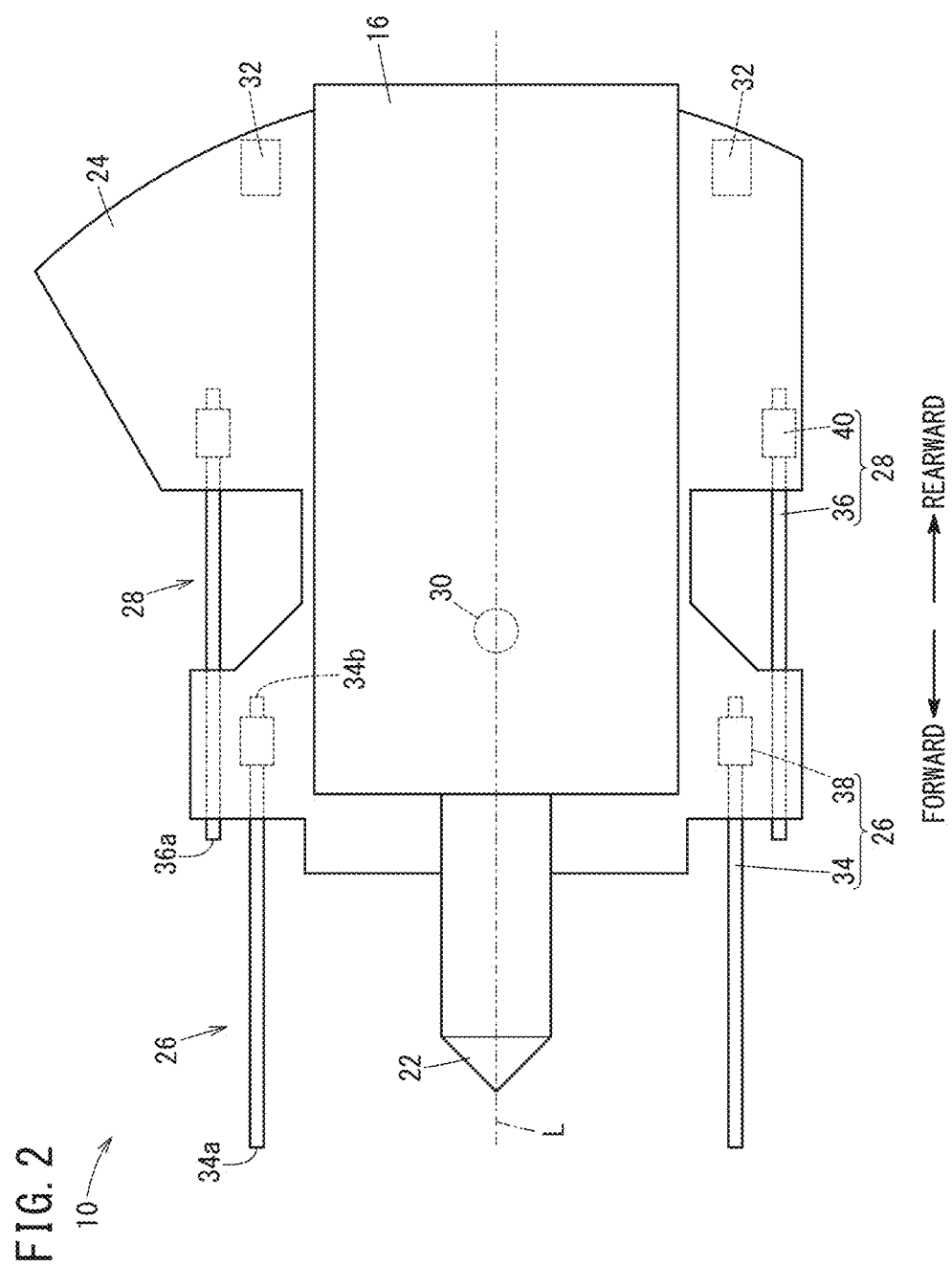
FIG. 2 is a top view of a linear motion mechanism of an injection molding machine of the first embodiment.

FIG. 1 is a side view of a linear motion mechanism 10 of an injection molding machine of the first embodiment. FIG. 2 is a top view of the linear motion mechanism 10 of an injection molding machine of the first embodiment. The forward and rearward directions referred to herein are indicated by the arrows in FIGS. 1 and 2.

As shown in FIG. 1, an injection molding machine 12 according to the present embodiment includes a machine base 14, an injection unit 16 on the machine base 14 and a clamping unit 18 disposed on the machine base 14, on the front side of the injection unit 16. The clamping unit 18 includes a mold 20 having an injection port. The injection unit 16 is attached to the machine base 14 via a linear motion mechanism 10. The linear motion mechanism 10 is a mechanism that moves the injection unit 16 in the front-rear direction, relative to the machine base 14.

The injection unit 16 is provided with an injection nozzle 22. The injection unit 16 is guided by the linear motion mechanism 10 so as to move linearly relative to the machine base 14, whereby the injection nozzle 22 is pressed against, or separated from, the injection port of the mold 20.

The linear motion mechanism 10 includes a base portion 24 supporting the injection unit 16 from below, and a pair of first linear guides 26 and a pair of second linear guides 28, which each support the injection unit 16 via the base portion 24 so that the injection unit can move linearly relative to the machine base 14. The paired second linear guides 28 are arranged more rearward than the paired first linear guides 26. Here, in the present embodiment, the positional relationship between the first linear guide 26 and the second linear guide 28 is defined by the positional relationship between the front-side end of an aftermentioned guide rail 34 of the first linear guide 26 and the front-side end of an aftermentioned guide rail 36 of the second linear guide 28. Therefore, as shown in FIG. 1, the state in which the front-side end, designated at 36a, of the guide rail 36 is located in the rear of the front-side end, designated at 34a, of the guide rail 34, is defined as a state in which the second linear guide 28 is arranged more rearward than the first linear guide 26.

The base portion 24 is, for example, a plate-shaped member. The base portion 24 has a pivot pin 30 for swiveling or rotating the injection unit 16 relative to the base portion 24, at a position on the center line L of an injection nozzle 22 in a plan view seen from above. This, for example, makes it easy to finely adjust the direction of the tip of the injection nozzle 22 in conformity with the shape of a mold 20 (injection port) used for molding. Further, slide plates 32 that slide relative to the machine base 14 are provided on a rear portion of the lower surface of the base portion 24. With this configuration, load applied to the first linear guides 26 and the second linear guides 28 can be reduced without inhibiting the linear motion of the injection unit 16.

The first linear guide 26 includes the guide rail 34 that is provided on the machine base 14 so as to extend in the front-rear direction, and a guide block 38 provided on the base portion 24 so as to be movable on the guide rail 34 in the front-rear direction. Similarly, the second linear guide 28 includes the guide rail 36 that is provided on the machine base 14 so as to extend in the front-rear direction, and a guide block 40 provided on the base portion 24 so as to be movable on the guide rail 36 in the front-rear direction. For example, one or more guide blocks 38 may be provided for one guide rail 34 in order to distribute and reduce the load applied to each of the guide blocks 38 and 40. Similarly, one or more guide blocks 40 may be provided for one guide rail 36.

The base portion 24, the pivot pin 30 and the slide plate 32 may be omitted. For example, the base portion 24 (and the pivot pin 30) may be omitted, and the first linear guide 26 and the second linear guide 28 may be adapted to directly support the injection unit 16.

As shown in FIG. 2, the paired first linear guides 26 are disposed symmetrically with respect to the center line L of the injection nozzle 22 in plan view seen from above, in a state where the center line L of the injection nozzle 22 is parallel to the front-rear direction, and the paired second linear guides 28 are disposed in the same manner. Owing thereto, the injection unit 16 can be stably supported on the machine base 14.

As described above, in the present embodiment, the front-side ends 36a of the guide rails 36 of the paired second linear guides 28 are located more rearward than the front-side ends 34a of the guide rails 34 of the paired first linear guides 26. Further, in the present embodiment, the guide rails 36 of the paired second linear guides 28 are arranged such that the front-side ends 36a are disposed more forward than the rear-side ends 34b of the guide rails 34 of the paired first linear guides 26. Therefore, the guide rails 36 of the paired second linear guides 28 and the guide rails 34 of the paired first linear guides 26 do not reside on the same lines.

In the linear motion mechanism 10 described above, the first linear guides 26 support the front portion of the injection unit 16 while the second linear guides 28 support the rear portion of the injection unit 16. As a result, each of the guide rails 34 and 36 can be made shorter in length than the guide rails of the conventional linear guide. Therefore, even if the injection molding machine 12 is large in size, the first linear guides 26 and the second linear guide 28 can be easy to obtain (i.e., the parts availability is improved).

In the above linear motion mechanism 10, the arrangement or layout of the linear guides can show good flexibility. For example, when the injection unit 16 is of a type with the weight concentrated in the vicinity of the injection nozzle 22, the load capacity of the guide rails 34 of the first linear guides 26 only is enhanced (by, for example, increasing the rail width). Together with this modification, only the first linear guides 26 may use the guide blocks 38 of a large type. In addition, for example, the distance between the paired first linear guides 26 may be narrowed so as to support the injection unit as close to the injection nozzle 22 as possible. On the other hand, for example, only the second linear guides 28 may use the guide rails 36 of a relatively small width. Together with this modification, the second linear guide 28 may use the guide blocks 40 of a small type. Also, for example, the distance between the paired second linear guides 28 can be made greater than that of the paired first linear guides 26 so as to support the injection unit 16 stably even when the width of the paired first linear guides 26 is narrowed.

Further, in the present embodiment, the front-side ends 36a of the guide rails 36 of the paired second linear guides 28 are located more forward than the rear-side ends 34b of the guide rails 34 of the paired first linear guides 26. In this arrangement, the second linear guides 28 do not need to be extended to the rear end of the injection unit 16. Accordingly, the machine base 14 does not need to be extended to the rear end of the injection unit 16 either, which is advantageous in making the machine base 14 compact (shortening the overall length of the machine base 14), and hence it is also advantageous for downsizing of the injection molding machine 12.

Additionally, in the present embodiment, the first linear guides 26 and the second linear guides 28 are configured to support the injection unit 16 via the base portion 24. This configuration can make it easy to change the injection unit 16, that is, the injection unit 16 can be changed merely by replacing the injection unit 16 on the base portion 24 with another unit.

[Modifications]

Though the first embodiment has been described as one example of the present invention, it goes without saying that various modifications and improvements can be added to the above first embodiment. It is apparent from the scope of the claims that modes added with such modifications and improvements should be incorporated in the technical scope of the invention.

(Modification 1)

Figure 3:
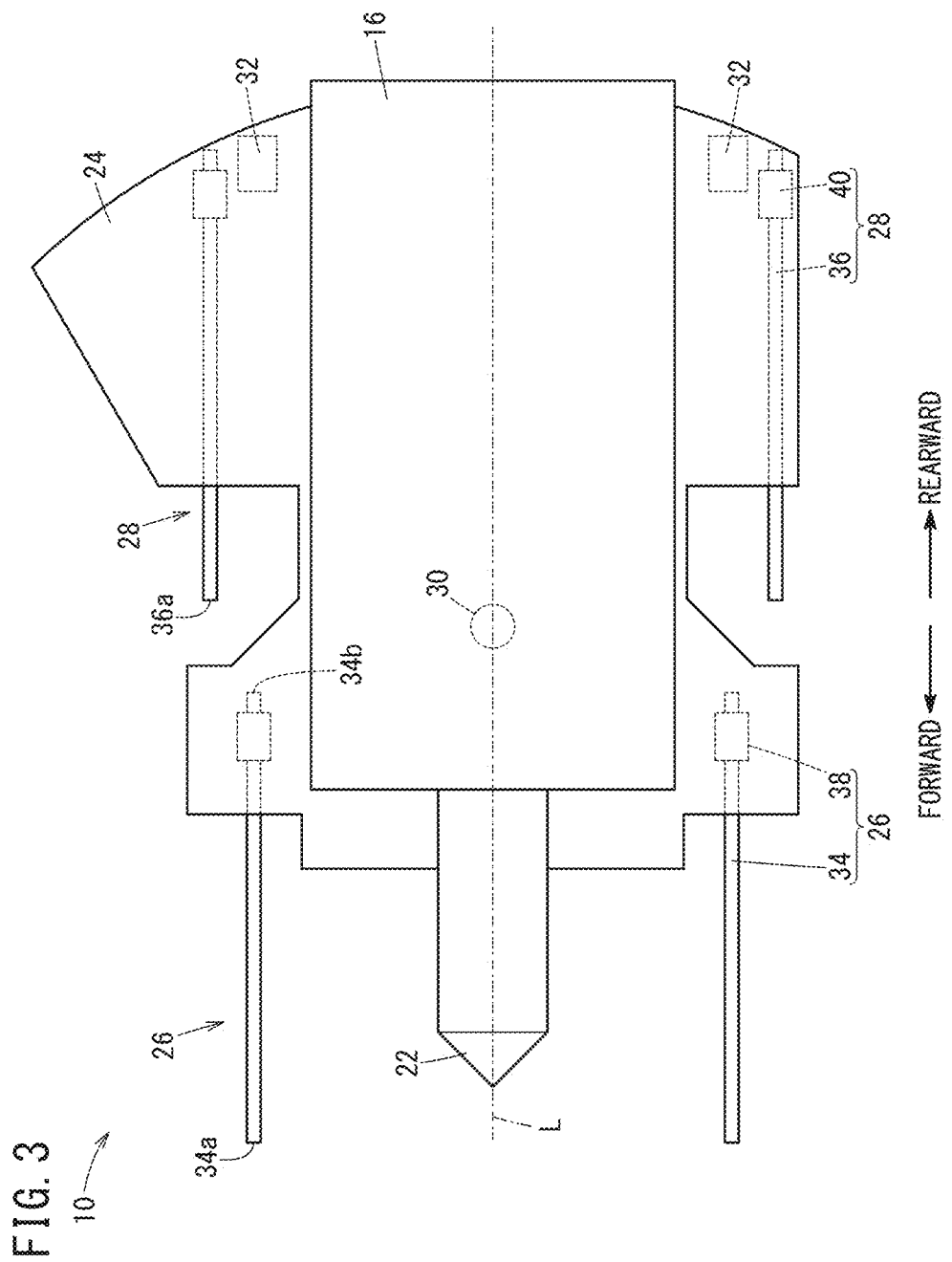
FIG. 3 is a top view of a linear motion mechanism of an injection molding machine of Modification 1.

FIG. 3 is a top view of a linear motion mechanism 10 of an injection molding machine of Modification 1.

For example, as shown in FIG. 3, the front-side ends 36a of the guide rails 36 of the paired second linear guides 28 are located more rearward than the rear-side ends 34b of the guide rails 34 of the paired first linear guides 26. Thus, the linear motion mechanism 10 according to the present invention offers good flexibility in arranging the linear guides.

(Modification 2)

Figure 4:
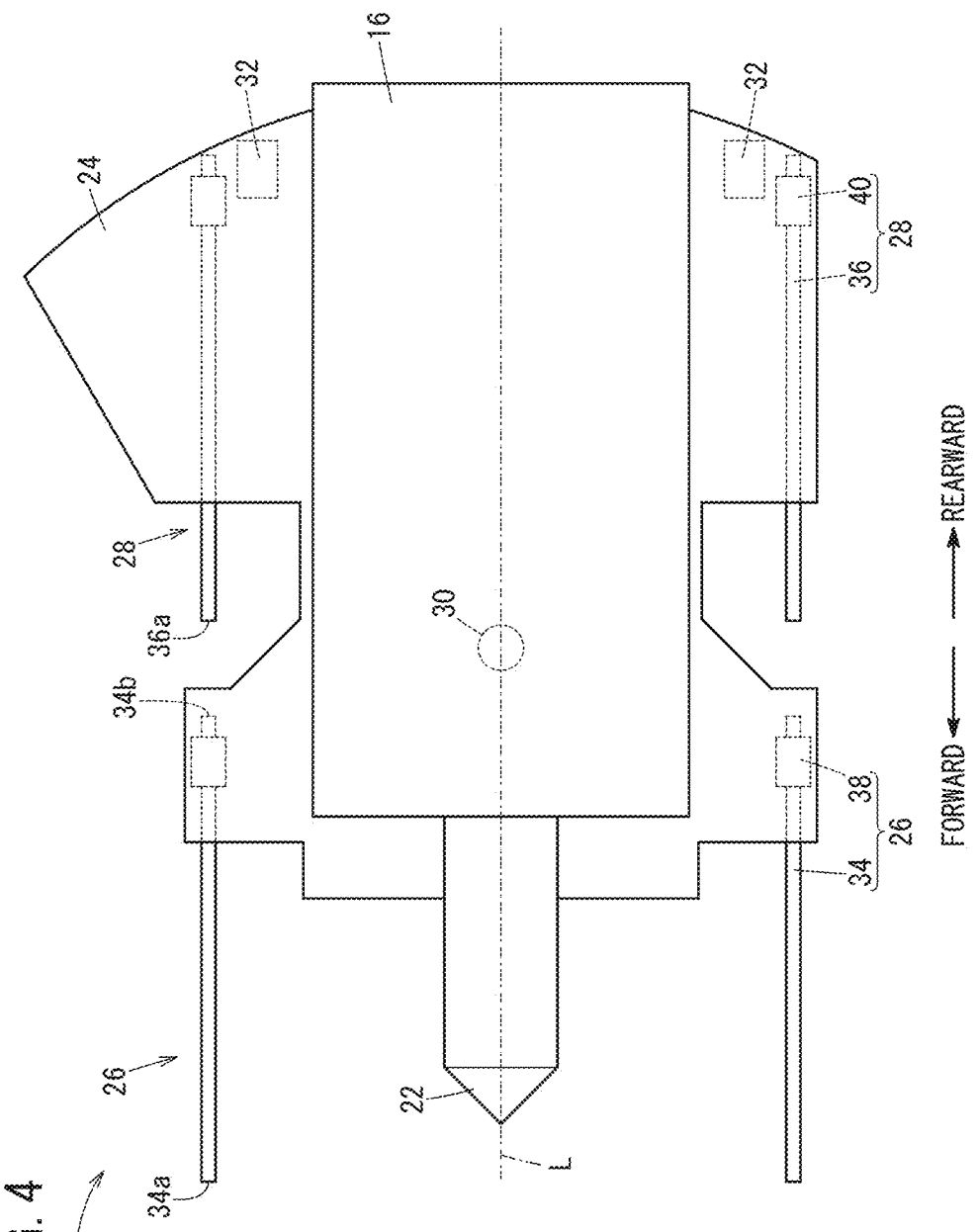
FIG. 4 is a top view of a linear motion mechanism of an injection molding machine of Modification 2.

FIG. 4 is a top view of a linear motion mechanism 10 of an injection molding machine of Modification 2.

In the first embodiment, an example has been described in which the guide rails 36 of the paired second linear guides 28 are not aligned with the guide rails 34 of the paired first linear guides 26. Yet, for example, the guide rails 34 of the paired first linear guides 26 and the guide rails 36 of the paired second linear guides 28 may be aligned with each other, as shown in FIG. 4. Thus, the linear motion mechanism 10 according to the present invention offers good flexibility in arranging the linear guides.

(Modification 3)

FIG. 5 is a top view of a linear motion mechanism 10 of an injection molding machine of Modification 3.

One or more pairs of second linear guides 28 may be provided. For example, the paired second linear guides 28 (see FIG. 2) described in the first embodiment and the paired second linear guides 28 (see FIG. 3) described in Modification 1 are arranged in different manners. By combining these arrangements, as shown in FIG. 5, multiple pairs of second linear guides 28 may be provided. Thus, the linear motion mechanism 10 according to the present invention offers good flexibility in arranging the linear guides.

(Modification 4)

FIG. 6 is a top view of a linear motion mechanism 10 of an injection molding machine of Modification 4.

For example, the method of arrangement or layout differs between the paired second linear guides 28 (see FIG. 3) described in Modification 1 and the paired second linear guides 28 (see FIG. 4) described in Modification 2. These arrangements may be combined to provide multiple pairs of second linear guides 28, as shown in FIG. 6. Thus, the linear motion mechanism 10 according to the present invention offers good flexibility in arranging the linear guides.

Invention Obtained from the Embodiment

The invention which can be grasped from the above-mentioned embodiment and Modifications is described below.

The linear motion mechanism (10) of an injection molding machine (12) for moving an injection unit (16) in the front-rear direction relative to a machine base (14) supporting the injection unit (16) includes: a pair of first linear guides (26) configured to linearly move the injection unit (16) relative to the machine base (14); and one or more pairs of second linear guides (28) arranged on the rear side relative to the pair of first linear guides (26), and configured to linearly move the injection unit (16) relative to the machine base (14).

The first linear guide (26) and the second linear guide (28) may be smaller than conventional linear guides. Therefore, this configuration offers good availability (procurability) and good flexibility in arrangement.

The pair of first linear guides (26) and the pair of second linear guides (28) may be arranged in parallel with the front-rear direction, and each pair may be disposed symmetrically with respect to the center line (L) of an injection nozzle (22) of the injection unit (16) in plan view, in a state where the center line (L) is parallel to the front-rear direction. With this configuration, the injection unit (16) can be stably supported on the machine base (14).

The linear motion mechanism (10) may further include a base portion (24) configured to support the injection unit (16), and the first linear guides (26) and the second linear guides (28) may be configured to support the injection unit (16) via the base portion (24) so as to be linearly movable. Thus, for example, this configuration can make it easy to change the injection unit (16), that is, the injection unit (16) can be changed merely by replacing the injection unit (16) on the base portion (24) with another unit.

The base portion (24) may be provided with a pivot pin (30) configured to rotate the injection unit (16) with respect to the base portion (24). This, for example, makes it easy to finely adjust the direction of the tip of the injection nozzle (22) in conformity with the shape of the mold (20) used for molding.

The pivot pin (30) may be located on the center line (L) of the injection nozzle (22) of the injection unit (16) in plan view. This, for example, makes it easy to finely adjust the direction of the tip of the injection nozzle (22) in conformity with the shape of the mold (20) used for molding.

The base portion (24) may be provided with a slide plate (32) configured to slide relative to the machine base (14). This, for example, makes it possible to reduce the load applied to the first linear guides (26) and the second linear guides (28) without inhibiting the linear motion of the injection unit (16).

Each of the first linear guides (26) and the second linear guides (28) may include a guide rail (34, 36) extending in the front-rear direction and a guide block (38, 40) movable along the front-rear direction on the guide rail (34, 36). The length of each of the guide rails (34) of the first linear guides (26) and the guide rails (36) of the second linear guides (28) can be made shorter than the guide rails of the conventional linear guide. Therefore, even if the injection molding machine (12) is large in size, this configuration offers good availability of the first linear guides (26) and the second linear guides (28). Also, for example, it is easy to make the distance between the paired first linear guides (26) and the distance between the paired second linear guides (28) different, as appropriate. Thus, the linear guides (26, 28) of the linear motion mechanism (10) according to the present invention offer good flexibility in arrangement or layout.

The front-side ends (36a) of the guide rails (36) of at least one pair of the second linear guides (28) may be located more rearward than the rear-side ends (34b) of the guide rails (34) of the first linear guides (26). Thus, the linear guides (26, 28) of the linear motion mechanism (10) according to the present invention offer good flexibility in arrangement.

The front-side ends (36a) of the guide rails (36) of at least one pair of the second linear guides (28) may be located more forward than the rear-side ends (34b) of the guide rails (34) of the first linear guides (26). Thus, the linear guides (26, 28) of the linear motion mechanism (10) according to the present invention offer good flexibility in arrangement. Further, in this arrangement, the second linear guides (28) do not need to be extended to the rear end of the injection unit (16). Accordingly, the machine base (14) does not need to be extended to the rear end of the injection unit (16) either, which is advantageous in making the machine base (14) compact, and hence it is also advantageous for downsizing of the injection molding machine (12).

The guide rails (36) of at least one pair of the second linear guides (28) may be arranged so as not to be aligned with the guide rails (34) of the first linear guides (26). Thus, the linear guides (26, 28) of the linear motion mechanism (10) according to the present invention offer good flexibility in arrangement.

The present invention is not particularly limited to the embodiment described above, and various modifications are possible without departing from the essence and gist of the present invention.

What is claimed is:

1. A linear motion mechanism of an injection molding machine for moving an injection unit in a front-rear direction relative to a machine base supporting the injection unit, comprising:

a pair of first linear guides configured to support a front portion of the injection unit and linearly move the injection unit relative to the machine base, wherein the first pair of linear guides each include a first guide rail and a first guide block; and one or more pairs of second linear guides arranged on a rear side relative to the pair of first linear guides, and configured to support a rear portion of the injection unit and linearly move the injection unit relative to the machine base, wherein the one or more second linear guides each include a second guide rail and a second guide block, the second guide rail being separate and apart from the first guide rail, the pair of the first linear guides are arranged in parallel with the front-rear direction and are disposed in a manner that a center line of the injection nozzle of the injection unit is interposed between the pair of the first linear guides in a state where the center line is parallel to the front-rear direction, the pair of the second linear guides are arranged in parallel with the front-rear direction and are disposed in a manner that the centerline is interposed between the pair of the second linear guides in a state where the center line is parallel to the front-rear direction, front-side ends of second guide rails of at least one pair of the second linear guides are located, with respect to the front-rear direction, between opposite ends of first guide rails of the first linear guides in the front-rear direction.

2. The linear motion mechanism of the injection molding machine according to claim 1, wherein the pair of first linear guides and the pair of second linear guides are arranged in parallel with the front-rear direction, and each pair are disposed symmetrically with respect to the center line of an injection nozzle of the injection unit in plan view, in a state where the center line is parallel to the front-rear direction.

3. The linear motion mechanism of the injection molding machine according to claim 1, further comprising a base portion configured to support the injection unit, wherein the first linear guides and the second linear guides are configured to support the injection unit via the base portion so as to be linearly movable.

4. The linear motion mechanism of the injection molding machine according to claim 3, wherein the base portion is provided with a pivot pin configured to rotate the injection unit with respect to the base portion.

5. The linear motion mechanism of the injection molding machine according to claim 4, wherein the pivot pin is located on a center line of an injection nozzle of the injection unit in plan view.

6. The linear motion mechanism of the injection molding machine according to claim 4, wherein the base portion is provided with a slide plate configured to slide relative to the machine base.

7. The linear motion mechanism of the injection molding machine according to claim 1, wherein front-side ends of the guide rails of at least one pair of the second linear guides are located more rearward than rear-side ends of the guide rails of the first linear guides.

8. The linear motion mechanism of the injection molding machine according to claim 1, wherein the guide rails of at least one pair of the second linear guides are arranged so as not to be aligned with the guide rails of the first linear guides.

9. The linear motion mechanism of the injection molding machine according to claim 2, wherein each of the first linear guides and the second linear guides includes a guide rail extending in the front-rear direction and a guide block movable along the front-rear direction on the guide rail.

10. The linear motion mechanism of the injection molding machine according to claim 9, wherein front-side ends of the guide rails of at least one pair of the second linear guides are located more rearward than rear-side ends of the guide rails of the first linear guides.

11. The linear motion mechanism of the injection molding machine according to claim 9, wherein front-side ends of the guide rails of at least one pair of the second linear guides are located more forward than rear-side ends of the guide rails of the first linear guides.

12. The linear motion mechanism of the injection molding machine according to claim 9, wherein the guide rails of at least one pair of the second linear guides are arranged so as not to be aligned with the guide rails of the first linear guides.

* * * * *